(12) United States Patent  (10) Patent No.: US 7,844,485 B2
Colson et al.                (45) Date of Patent:    Nov. 30, 2010

(54) METHOD AND APPARATUS FOR PLAYING AUDIBLE ADVERTISEMENTS ON A COMMUNICATION DEVICE

(75) Inventors: James C. Colson, Austin, TX (US); Brian Lee White Eagle, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 392 days.

(21) Appl. No.: 11/936,571

(22) Filed: Nov. 7, 2007

(65) Prior Publication Data

US 2009/0119136 A1 May 7, 2009

(51) Int. Cl.
*G06F 17/00* (2006.01)
(52) U.S. Cl. ....................................... 705/10
(58) Field of Classification Search ............. 705/10, 705/14
See application file for complete search history.

(56) References Cited

U.S. PATENT DOCUMENTS

| 4,811,382 | A |   | 3/1989 | Sleevi |
| 5,428,670 | A |   | 6/1995 | Gregorek et al. |
| 6,157,814 | A | * | 12/2000 | Hymel et al. ............. 340/7.56 |
| 7,317,383 | B2 | * | 1/2008 | Ihara et al. ................. 340/435 |
| 7,509,149 | B2 |   | 3/2009 | Shim et al. |
| 7,548,915 | B2 | * | 6/2009 | Ramer et al. ................... 707/5 |
| 7,602,901 | B1 | * | 10/2009 | Kates et al. ............ 379/373.01 |
| 2004/0180700 | A1 |   | 9/2004 | Hubbe et al. |
| 2006/0041474 | A1 | * | 2/2006 | Westling et al. ............... 705/14 |
| 2006/0262924 | A1 |   | 11/2006 | Weiss et al. |
| 2007/0093242 | A1 |   | 4/2007 | Small et al. |
| 2007/0112977 | A1 |   | 5/2007 | Hornal et al. |
| 2007/0116227 | A1 | * | 5/2007 | Vitenson et al. ......... 379/207.02 |
| 2008/0189329 | A1 | * | 8/2008 | Weaver .................... 707/104.1 |
| 2009/0154680 | A1 |   | 6/2009 | Weiss et al. |
| 2010/0027776 | A1 |   | 2/2010 | Stifelman et al. |

FOREIGN PATENT DOCUMENTS

| FR | 2860943 A1 | 4/2005 |
| JP | 2006301734 | 11/2006 |
| WO | 9605684 A1 | 2/1996 |
| WO | 2006115842 A2 | 11/2006 |

OTHER PUBLICATIONS

No author; South Africa—MTN launchesd CallerTunez service; Nov. 21, 2005; Telecompaper Africa/Asia, dialog copy 1 page.*
USPTO notice of allowance for U.S. Appl. No. 11/936,566 dated Jul. 6, 2010.

* cited by examiner

*Primary Examiner*—Thomas Dixon
(74) *Attorney, Agent, or Firm*—Yee & Associates, P.C.; David A. Mims, Jr.

(57) ABSTRACT

The illustrative embodiments described herein provide a computer implemented method, apparatus, and computer program product for playing audible advertisements on a communication device. In response to receiving a request from a caller to initiate a call, an audible advertisement from a set of audible advertisements is selected using criteria matching a user profile associated with the caller. The audible advertisement is played on the communication device to the caller prior to initiating a connection to a callee.

20 Claims, 4 Drawing Sheets

METHOD AND APPARATUS FOR PLAYING AUDIBLE ADVERTISEMENTS ON A COMMUNICATION DEVICE

CROSS REFERENCE TO RELATED APPLICATION

The present invention is related to the following patent application: entitled "Method and Apparatus for Distributing Targeted Audible Advertisements as Ringtones", Ser. No. 11/936,566, filed even date hereof, assigned to the same assignee, and incorporated herein by reference.

BACKGROUND OF THE INVENTION

1. Field of the Invention

The present invention relates generally to a method for targeting advertisements to a specific demographic. Still more particularly, the present invention relates to a method, apparatus, and a computer program product playing audible advertisements on a communication device.

2. Description of the Related Art

Mobile devices are ubiquitous and popular. Mobile devices may include, for example, mobile phones and personal digital assistants that are capable of wireless connections. Advertisers would like to leverage this ubiquity while continuing to target advertisements to individuals. Additionally, advertisers would like to leverage location information to help target the advertisements.

Several factors complicate the goals of the advertiser to exploit this mobile ubiquity. For example, mobile devices are small with limited display capability and limited and/or expensive bandwidth. The conventional means by which advertisers have exploited mobile devices include embedding advertising into visual content, such as advertisements on a web page. This approach has been met with great resistance by the end user because of the limitations of the display and the associated drawbacks on the end user's bandwidth. An end user, as referenced herein, is the person or persons who will be using a particular technology and for whom it is designed.

Another approach that has been met with mixed results is to deliver short message service (SMS) text, often called text messaging, with targeted advertising based on an end user's location. This approach has the downside of being intrusive because the end user spends time opening and reading the text message with the expectation that it is from a friend or colleague.

One possible approach to a less intrusive targeted advertising model is to allow users to "shop" for free ring tones that contain embedded advertisements. Upon acquisition and installation of an advertisement laden ringtone, the end user is presented with an audible advertisement as a prelude to the standard ring process. The downside of this approach is that the advertiser is dependent on a shopping process initiated by the end user.

SUMMARY OF THE INVENTION

The illustrative embodiments described herein provide a computer implemented method, apparatus, and computer program product for playing audible advertisements on a communication device. In response to receiving a request from a caller to initiate a call, an audible advertisement from a set of audible advertisements is selected using criteria matching a user profile associated with the caller. The audible advertisement is played on the communication device to the caller prior to initiating a connection to a callee.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
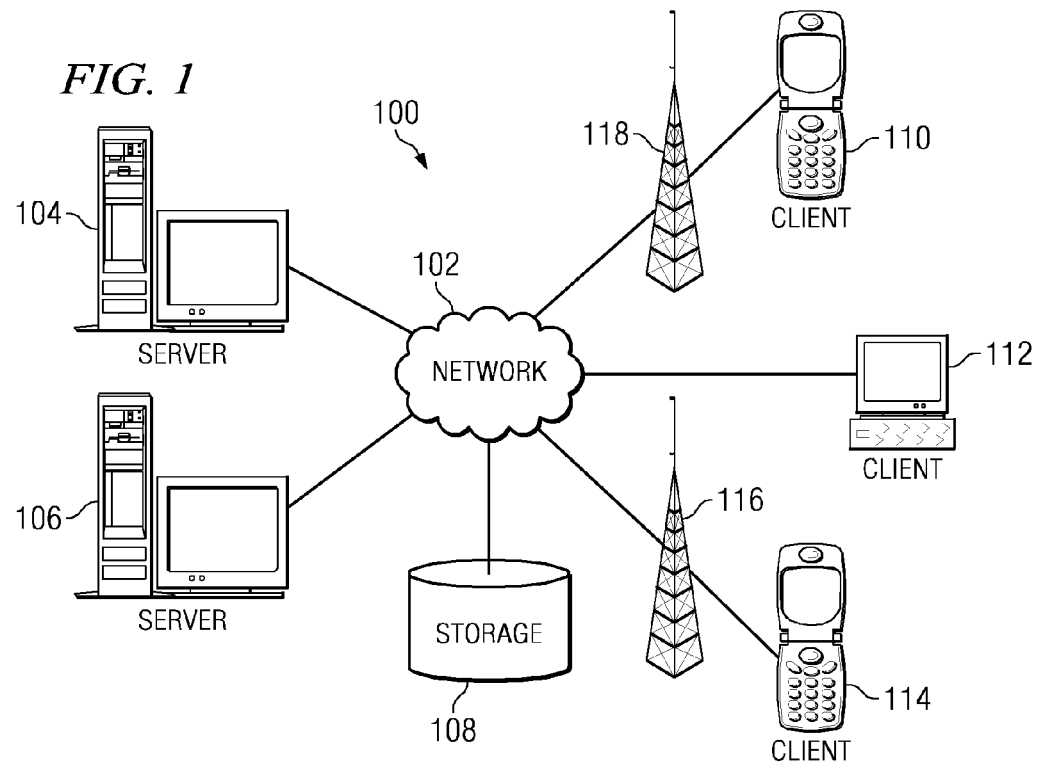
FIG. 1 is a pictorial representation of a network of data processing systems and communication devices in which illustrative embodiments may be implemented.
Figure 2:
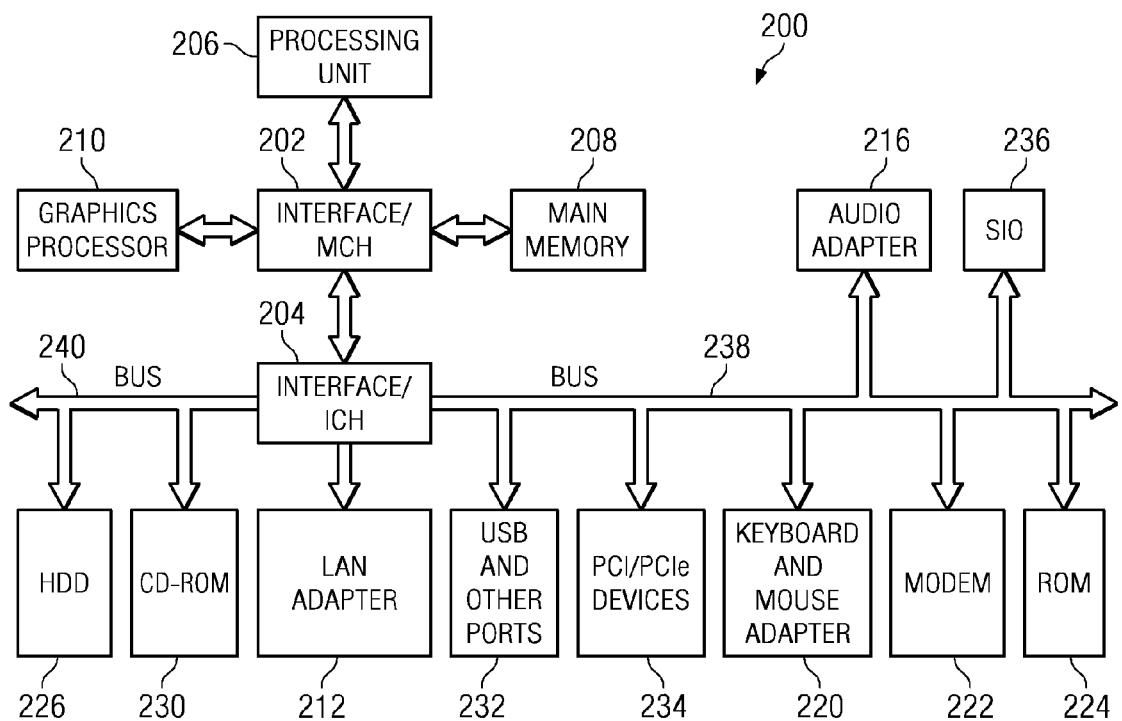
FIG. 2 is a block diagram illustrating a data processing system in which illustrative embodiments may be implemented.

With reference now to the figures, and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, fiber optic cables, or wireless communication links, such as radio towers 116, and 118.

In the depicted example, server 104 and server 106 connect to network 102 along with storage unit 108. In addition, clients 110, 112, and 114 connect to network 102. Clients 110, 112, and 114 may be, for example, personal computers, network computers, personal digital assistants (PDA), cellular communication devices, and wired communication devices. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

The illustrative embodiments, described herein, receive targeted audible advertisements from a server, such as server 104, over a network, such as network 102, to a client, such as client 110. In response to receiving a request from a caller to initiate a call, an audible advertisement from a set of audible advertisements is selected using criteria matching a user profile associated with a caller. A caller may initiate a device by, but not limited to, removing the phone off the base receiver, as in the instance of a land-line telephone, or by depressing a key, such as "TALK", on a cellular device. The audible advertisement is played on the communication to the caller device prior to initiating a connection to a callee.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including interface and memory controller hub (interface/MCH) 202 and interface and input/output (I/O) controller hub (interface/ICH) 204. Processing unit 206, main memory 208, and graphics processor 210 are coupled to interface and memory controller hub 202. Processing unit 206 may contain one or more processors and even may be implemented using one or more heterogeneous processor systems. Graphics processor 210 may be coupled to the interface/MCH through an accelerated graphics port (AGP), for example.

In the depicted example, local area network (LAN) adapter 212 is coupled to interface and I/O controller hub 204 and audio adapter 216, keyboard and mouse adapter 220, modem 222, read only memory (ROM) 224, universal serial bus (USB) and other ports 232, and PCI/PCIe devices 234 are coupled to interface and I/O controller hub 204 through bus 238, and hard disk drive (HDD) 226 and CD-ROM 230 are coupled to interface and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to interface and I/O controller hub 204.

An operating system runs on processing unit 206 and coordinates and provides control of various components within data processing system 200 in FIG. 2. The operating system may be a commercially available operating system such as Microsoft® Windows Vista™ (Microsoft and Windows Vista are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in interface and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
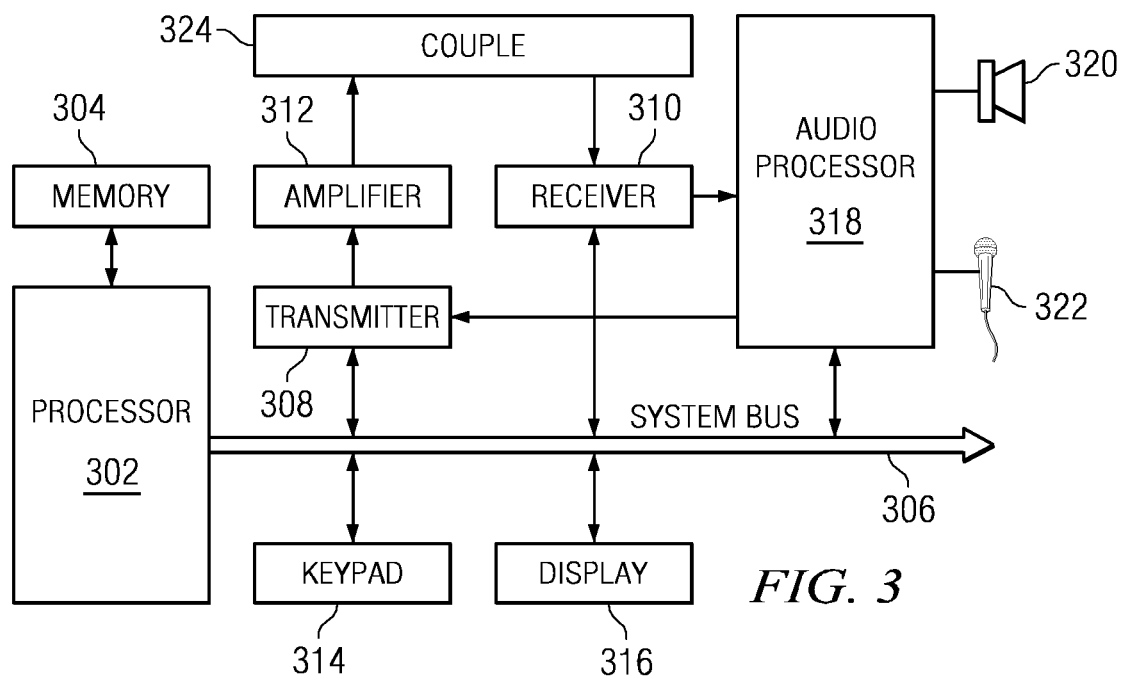
FIG. 3 is a block diagram illustrating a communication device in which illustrative embodiments may be implemented.

FIG. 3 is an exemplary block diagram of a wireless communication device in which illustrative embodiments may be implemented. Wireless communication device 300 includes processor 302 for controlling the operation of the communication device and memory 304. Processor 302 may be a general-purpose microprocessor operating under the control of instructions stored in a memory, such as memory 304, or device-specific circuitry for controlling the operation of the telephone device. Processor 302 is connected by system bus 306 to transmitter 308, receiver 310, keypad 314, display 316, and audio processor 318. Keypad 314 may be a keypad and/or buttons. Display 316 may be any type of display device including a liquid crystal display (LCD) or other known displays, such as a cathode ray tube or active matrix display.

Transmitter 308 and receiver 310 are coupled to a telephone signal by couple 324 to provide full duplex communication. The telephone signal may be provided by a telephone line (not shown) in a land-based telephone or an antenna, such as for a wireless telephone. Audio processor 318 provides basic analog audio outputs to speaker 320 and accepts analog audio inputs from microphone 322. Received signals are demodulated and decoded by receiver 310. Transmitter 308 encodes and modulates signals passed to it by processor 302 or audio processor 318. The output of the transmitter is amplified by power amplifier 312 to control the power level at which the signal is transmitted.

Processor 302 or audio processor 318 may detect audible call status information and call status codes received by receiver 310. Memory 304 may include a lookup table associating call status information or call status codes with visual call status information, such as text messages. Processor 302 detects or receives a call status code and displays an appropriate call status message on display 316. Those of ordinary skill in the art will appreciate that the hardware depicted in FIG. 3 may vary.

The illustrative embodiments recognize the disadvantages of the current methods being employed by advertisers, such as, but not limited to, limited display capability, limited and/or expensive bandwidth, and the inability to target a specific demographic or a specific location. Accordingly, the illustrative embodiments described herein provide a computer implemented method, apparatus, and computer program product for playing audible advertisements on a communication device. In response to receiving a request from a caller to initiate a call, an audible advertisement from a set of audible advertisements is selected using criteria matching a user profile associated with a caller. The audible advertisement is played on the communication device to the caller prior to initiating a connection to a callee. The callee, as used herein, is a person who or device that answers a telephone call. The callee may be more than one person or device, such as, but not limited to, the instance of a conference call.

The communication devices may be, but are not limited to, personal computers, network computers, personal digital assistants (PDA), cellular communication devices, and wired communication devices. An advertisement is defined as a public promotion of a specific product or service.

Figure 4:
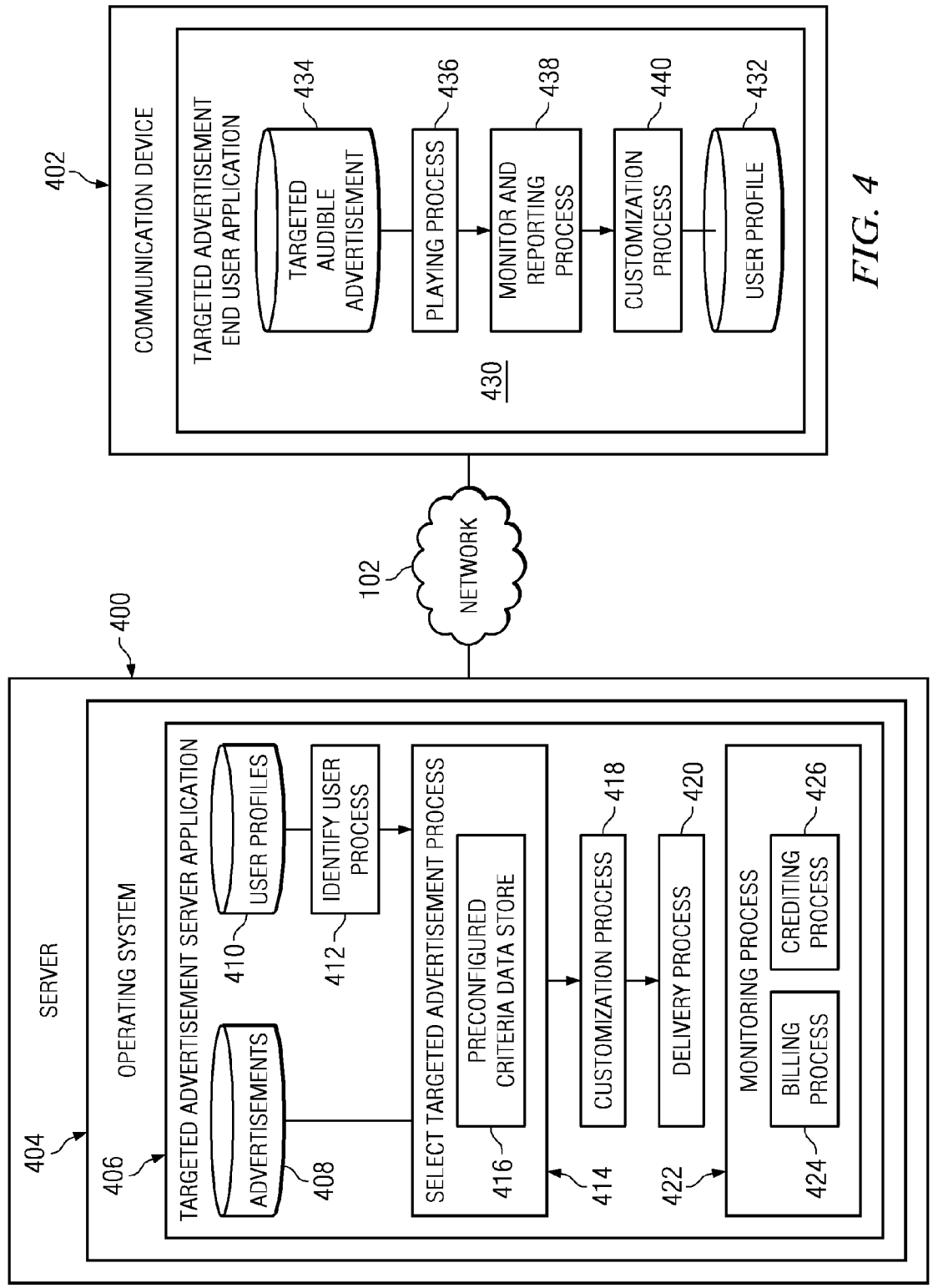
FIG. 4 is a block diagram illustrating the components of a targeted advertisement application in accordance with an illustrative embodiment.

With reference now to FIG. 4, a block diagram illustrating the components of a targeted advertisement application in accordance with an illustrative embodiment is presented. FIG. 4 depicts server 400 communicating with communication device 402 over a network, such as network 102 as shown in FIG. 1. Server 400 may be implemented in a data processing system, such as server 104 shown in FIG. 1 or data processing system 200 shown in FIG. 2. Communication device 402 may be implemented in a data processing system or a wireless communication device, such as wireless communication device 300 in FIG. 3.

Operating system 404 runs on server 400. Operating system 404 may be implemented using any commercially available operating system, such as, for example, Microsoft® Windows Server® operating systems. Targeted advertisement server application 406 runs on operating system 404. In these examples, targeted advertisement server application 406 includes advertisements data store 408, user profiles data store 410, identify user process 412, select targeted advertisement process 414, preconfigured criteria data store 416, customization process 418, delivery process 420, and monitoring process 422.

Targeted advertisement server application 406 responds to receiving a request from a caller to initiate a call. Targeted advertisement server application 406 stores or communicates with advertisements data store 408 and user profiles data store 410. Advertisements data store 408 contains a plurality of audible advertisements targeted to a specific demographic.

Targeted advertisement server application 406 has identify user process 412 that identifies a user profile associated with a caller of a communication device currently being used as the medium for presenting the audible advertisement. Identify user process 412 may also identify the current location of the communication device.

Select targeted advertisement process 414 selects a targeted advertisement for a caller using a preconfigured criterion matching the user profile. The criterion may be selected from a set of criteria stored in a data store, such as preconfigured criteria data store 416.

In one illustrative embodiment, customization process 418 customizes the selected audible advertisement based on the user profile. For example, customization process 418 may insert a greeting with a name associated with the user profile prior to playing the selected audible advertisement. Additionally, customization process 418 may also insert other user specific information directly into the selected audible advertisement, such as, but not limited to, inserting the name of a pet associated with the user as part of a selected audible advertisement pertaining to pet products or services.

Delivery process 420 delivers the selected audible advertisement to the communication device. A communication device may store the delivered audible advertisements locally in a data store of audible advertisement, such as targeted audible advertisement data store 434. The selected audible advertisement is played on the communication device to the caller prior to initiating a connection to a callee.

In another illustrative embodiment, targeted advertisement server application 406 may contain monitoring process 422. Monitoring process 422 remotely monitors the usage of the selected audible advertisement. The monitored data may include, but is not limited to, the length of time the caller allows the audible advertisement to be played prior to terminating the selected audible advertisement, and the number of times a selected audible advertisement has been played.

The selected audible advertisement may be terminated in a number of different ways. In the case of a land-line, the selected audible advertisement may be terminated by, but not limited to, the caller dialing a phone number. In the case of other communication devices, such as, but not limited to, cellular phones, the selected audible advertisement may be terminated by, but not limited to, the caller depressing a certain key.

Monitoring process 422 may contain crediting process 426 associated with the monitored data. For example, a service provider may provide incentives for a caller to listen to the audible advertisements, such as, but not limited to, free service, extra minutes, entering the user into promotional contests, or crediting an account associated with the caller. The amount of minutes associated with free service may be tied to the number of times a caller listens to the audible advertisements. In one illustrative embodiment, monitoring process 422 may require the caller to perform a particular action with the communication device to ensure that the caller is in fact listening to the audible advertisements.

Similarly, monitoring process 422 may contain billing process 424. Billing process 424 may bill advertisers of the selected audible advertisements for the number of times a caller listens to the targeted audible advertisement. In one illustrative embodiment, billing process 424 may provide advertisers with information concerning the effectiveness of their audible advertisements. For example, billing process 424 may report the percentage of callers that listen to a particular advertisement until completion, or the percentage of callers that interact with a particular audible advertisement.

With reference now to communication device 402, communication device 402 contains targeted advertisement end user application 430. Targeted advertisement end user application 430 may store a user profile associated with a caller in a data store, such as user profile data store 432. In one illustrative embodiment, targeted advertisement end user application 430 sends the user profile to server 400 in response to a request for a new audible advertisement or in response to a request from server 400 for the user profile.

In another illustrative embodiment, targeted advertisement end user application 430 may receive selected audible advertisements from server 400 to be stored locally. The caller's communication device initiates playing process 436, to play a locally stored audible advertisement in response to receiving a request from a caller to initiate a call.

By storing the selected audible advertisements locally, targeted advertisement end user application 430 is able to rotate selected audible advertisements without having to request a new selected audible advertisement from server 400 each time.

Additionally, by enabling the local storage of selected audible advertisements, server 400 may send a particular audible advertisement to a plurality of users without having to flood the network. The audible advertisement may be configured to play prior to a major event. Examples of major events may be, but are not limited to, a sporting event or the premier of a new show. Targeted advertisement end user application 430 stores this particular audible advertisement in targeted audible advertisement data store 434. Targeted advertisement end user application 430 plays this particular audible advertisement at a predetermined time prior to the major event occurring in response to receiving a request from a caller to initiate a call.

In another illustrative embodiment, targeted advertisement end user application 430 implements monitoring and reporting process 438. Monitoring and reporting process 438 locally monitors the usage of the selected audible advertisement. The monitored data includes, but is not limited to, the length of time the caller allows the audible advertisement to be played prior to terminating the selected audible advertisement, and the number of times a selected audible advertisement has been played. Monitoring and reporting process 438 may send the monitored data at a predetermined time based on a predetermined configuration, such as, but not limited to, when the number of audible advertisements that have been played reaches a threshold value or when the network bandwidth is low.

In another illustrative embodiment, as an alternative to server 400 performing the function of customizing the selected audible advertisement, targeted advertisement end user application 430 may contain customization process 440. Customization process 440 customizes the selected audible advertisement to the user. For example, customization process 440 may insert a greeting with the caller's name prior to playing the selected audible advertisement.

Figure 5:
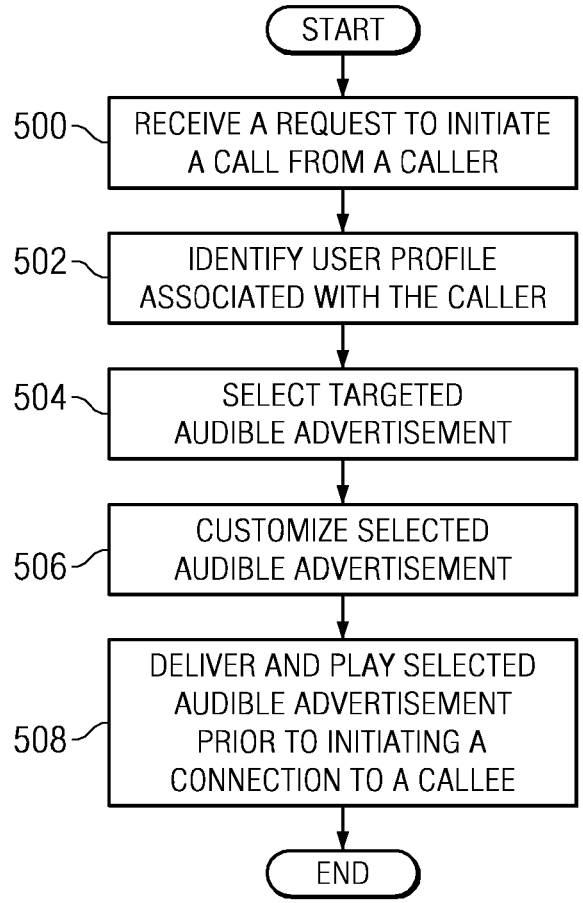
FIG. 5 is a flowchart illustrating a server process for playing targeted audible advertisements in accordance with an illustrative embodiment.

With reference now to FIG. 5, a flowchart illustrating a server process for playing targeted audible advertisements is presented in accordance with an illustrative embodiment. The process in FIG. 5 may be implemented by a server application, such as target advertisement server application 406 in FIG. 4.

The process begins when a server application receives a request to initiate a call from a caller (step 500). The request to initiate a call may be indicated in numerous ways, such as, but not limited to, detecting the removal of a land-line phone from a base receiver. Additionally, the request to initiate a call may be indicated by the caller pressing the talk or send button on a communication device, such as, but not limited to, a cellular phone. The request to initiate a call may also be indicated by the caller dialing a telephone number.

The process identifies a user profile associated with the caller (step 502). The user profile may be stored locally on a server in a data store of user profiles, such as user profiles data store 410 shown in FIG. 4.

Alternatively, the user profile may be stored locally on a communication device and a remote request may be initiated to retrieve the user profile and the current location of the communication device. The user profile may contain a designated location, such as, but not limited to, the home address of the caller. Alternatively, the current location of the communication device may be determined remotely through a network.

A targeted audible advertisement is selected for the caller using preconfigured criteria matching the user profile (step 504). The criteria may include, but are not limited to, the location of the caller, the age of the caller, and the income level associated with the caller.

The selected audible advertisement may be customized prior to playing the selected audible advertisement on the caller's communication device (step 506). The selected audible advertisement is delivered to the communication device and is played to the caller prior to initiating a connection to a callee (step 508), with the process terminating thereafter.

The selected audible advertisement may be played prior to connecting the communication device to a communication network. Alternatively, the selected audible advertisement may be played after connecting the communication device to a communication network but prior to initiating a connection to a callee. In the case of a cellular network, connection to a communication network means the communication device is connected to a mobile telephone switching office (MTSO). The MTSO handles all of the phone connections to the normal land-based phone system, and controls all of the base stations in the region. If the communication device is connected through a land-line network, the selected audible advertisement may replace the standard dial tone after connecting to the telephone switching office to indicate that the communication device is ready to initiate a call.

The selected audible advertisement is played prior to the telephone switching office initiating a connection to a callee. In the case of a cellular network, initiating a connection to a callee means performing the process of connecting the caller's communication device with the callee's communication device. This process includes determining the cell in which the recipient's communication device is located, selecting a frequency pair to use during the communication, and communicating to the recipient's communication device the frequency pair to use. After the telephone switching office communicates to the Recipient's communication device the frequency pair to use, a ringing sound is played back to the caller. The ringing sound is typically referred to as a ringback. Once the recipient's communication device switches on to the frequency pair, the call is connected.

Figure 6:
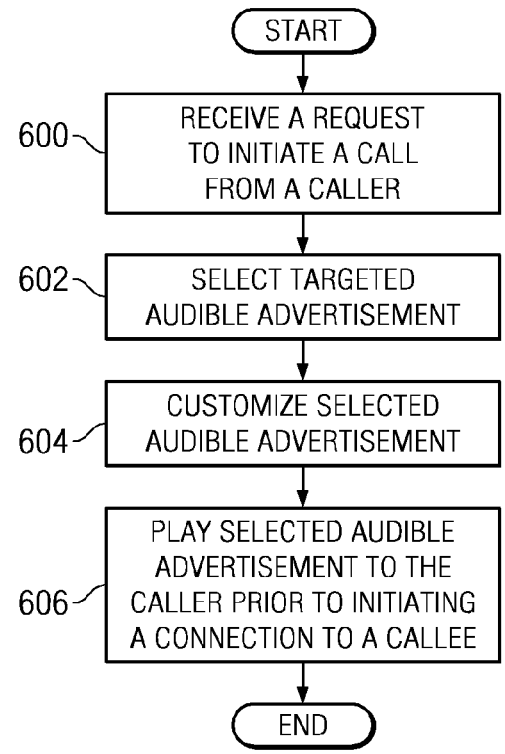
FIG. 6 is a flowchart illustrating a process for playing locally stored targeted audible advertisements on a communication device in accordance with an illustrative embodiment.

With reference now to FIG. 6, a flowchart illustrating a communication device process for playing locally stored targeted audible advertisements is depicted in accordance with an illustrative embodiment. The process in FIG. 6 may be implemented by a communication device application, such as targeted advertisement end user application 430 in FIG. 4.

The process begins when a communication device application receives a request to initiate a call from a caller (step 600). A targeted audible advertisement, stored locally in a data store, is selected (step 602). The selected audible advertisement may be customized prior to playing the selected audible advertisement (step 604). The selected audible advertisement is played to the caller prior to initiating a connection to a callee (step 606), with the process terminating thereafter. As previously described in FIG. 5 at step 508, the selected audible advertisement may be played prior to or after connecting the communication device to a communication network, such as a telephone switching office, but prior to initiating a connection to a callee.

Figure 7:
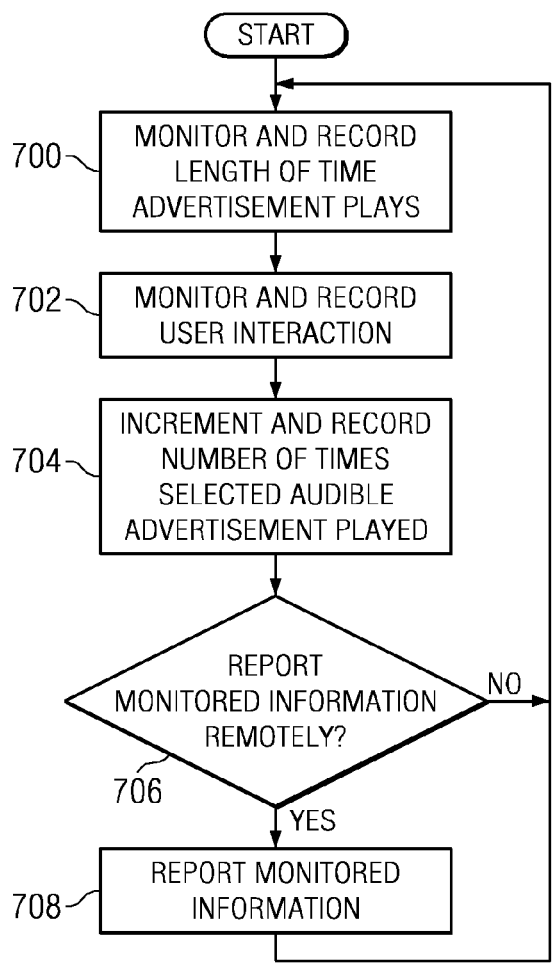
FIG. 7 is a flowchart illustrating a process for locally monitoring the usage of selected audible advertisements in accordance with an illustrative embodiment.

FIG. 7 is a flowchart illustrating a process for locally monitoring the usage of selected audible advertisements in accordance with an illustrative embodiment. The process in FIG. 7 may be implemented by a communication device application, such as, targeted advertisement end user application 430 in FIG. 4.

The process begins by monitoring and recording the length of time a selected audible advertisement plays prior to a caller terminating the selected audible advertisement (step 700). In one illustrative embodiment, the selected audible advertisement may terminate when the caller enters a phone number. In another illustrative embodiment, the selected audible advertisement terminates when a connection is made between the calling parties.

The monitored information may be used to effectively credit the user's account and bill the advertisers. In addition, the process may perform certain actions based on the monitored data. For example, if only a part of the selected audible advertisement is played prior to the selected audible advertisement terminating, the selected audible advertisement may remain as the user's selected audible advertisement until a determination has been made that the entire audible advertisement has been played.

Additionally, the process monitors and records any interaction between the caller and the selected audible advertisement (step 702). The caller may interact with the audible advertisement in a number of ways, such as, but not limited to, conducting a dialog, wherein the caller responds to prompts presented as part of the audible advertisement. Additionally, the selected audible advertisement may allow the caller to press a key to connect directly to a service that is being advertised or may request the caller to respond to a question by pressing a key. The interaction may also be in the form of a verbal response to a question or a prompt.

The process increments and records the number of times a selected audible advertisement has been played (step 704). The process then determines whether the monitored information is reported remotely (step 706). The determination may be made based on a preconfigured parameter, such as, but not limited to, when the number of audible advertisements that have been played reaches a preconfigured threshold value or when the network bandwidth is low.

If the process determines not to report the monitored information, the process returns to step 700. If the process determines to report the monitored information, the monitored information is reported remotely to a server (step 708), with the process returning to step 700.

Figure 8:
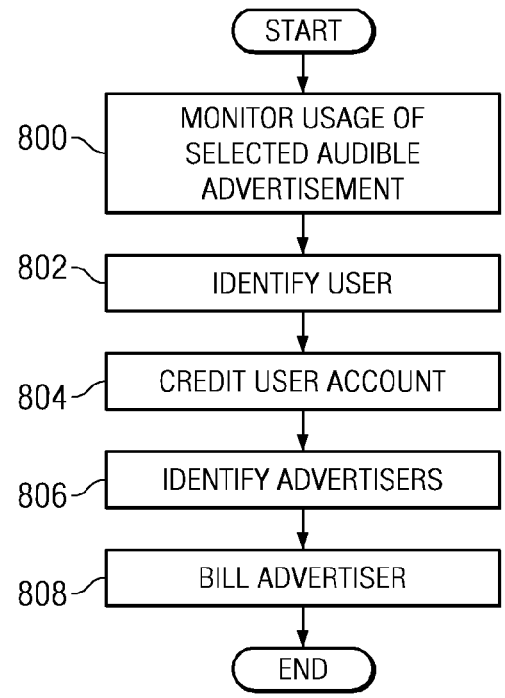
FIG. 8 is a flowchart illustrating a process for remotely monitoring the usage of selected audible advertisements in accordance with an illustrative embodiment.

With reference now to FIG. 8, a flowchart illustrating a process for remotely monitoring the usage of selected audible advertisements in accordance with an illustrative embodiment is presented. The process in FIG. 8 may be implemented by a server application, such as target advertisement server application 406 in FIG. 4.

The process begins by monitoring the usage of selected audible advertisements to determine the qualitative and quantitative effectiveness of the selected audible advertisement (step 800). The monitored information may include, but is not limited to, the length of time the caller allows the audible advertisement to be played prior to terminating the audible advertisement and the number of times a selected audible advertisement has been played. Additionally, other aspects of the selected audible advertisement may be determined, such as, but not limited to, whether the caller interacts with the selected audible advertisement, or whether the caller calls a phone number or visits a website associated with the selected audible advertisement.

Furthermore, the monitoring process may be performed remotely, or information from a communication device may be requested by the server. Alternatively, a communication device may routinely send locally monitored information to a remote server at preconfigured intervals.

The user data associated with the monitored data, retrieved at step 800, is identified (step 802). The user data may include, but is not limited to, the caller's name, address, and telephone number. Additionally, the process may store the user data in a user data store.

As part of the incentive for callers to listen to a selected audible advertisement, an account associated with the caller is credited based on the monitored information (step 804). The credit may be a monetary and/or a non-monetary benefit, such as, but not limited to, receiving award points redeemable for certain products or services.

Similarly, the advertisers associated with the monitored data, retrieved at step 800, are identified (step 806). The advertisers are billed for the advertising service (step 808), with the process terminating thereafter. Billing may be based on a flat rate or at a rate based on the monitored usage data.

The flowchart and block diagrams in the figures illustrate the architecture, functionality, and operation of possible implementations of systems, methods and computer program products according to various embodiments. In this regard, each step in the flowchart or block diagrams may represent a module, segment, or portion of code, which comprises one or more executable instructions for implementing the specified logical function(s). It should also be noted that, in some alternative implementations, the functions noted in the step may occur out of the order noted in the figures. For example, two steps shown in succession may, in fact, be executed substantially concurrently, or the steps may sometimes be executed in the reverse order, depending upon the functionality involved.

Thus, the illustrative embodiments described herein provide a computer implemented method, apparatus, and computer program product for playing audible advertisements on a communication device. In response to receiving a request from a caller to initiate a call, an audible advertisement from a set of audible advertisements is selected using criteria matching a user profile associated with a caller. The audible advertisement is played on the communication device to the caller prior to initiating a connection to a callee.

The above process is performed without requiring the caller to perform any additional actions beyond the ordinary call process. Therefore, the illustrated embodiments provide a method for targeting audible advertisements to a specific demographic in a non-intrusive manner. Furthermore, advertisers may target audible advertisements to a specific demographic and/or a specific location.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for playing audible advertisements on a communication device, the computer implemented method comprising:
    responsive to receiving a request from a caller to initiate a call, selecting, by a processor executing computer code, an audible advertisement from a set of audible advertisements using criteria matching a user profile associated with the caller;
    playing the audible advertisement on the communication device to the caller prior to initiating a connection to a callee; and
    upon determining that the audible advertisement does not complete before initiating the connection, designating the audible advertisement to remain the selected audible advertisement of the caller.

2. The computer implemented method of claim 1, wherein playing the audible advertisement on the communication device indicates that the communication device is ready to initiate the call.

3. The computer implemented method of claim 1, wherein the computer implemented method is initiated by a remote service provider in response to receiving the request from the user to initiate the call using the communication device.

4. The computer implemented method of claim 1, wherein the computer implemented method is initiated by the communication device.

5. The computer implemented method of claim 1, further comprising:
    substituting a dial tone associated with the communication device with the audible advertisement.

6. The computer implemented method of claim 1, further comprising:
    customizing the audible advertisement using the user profile.

7. The computer implemented method of claim 1, further comprising:
    initiating the call after the audible advertisement terminates.

8. The computer implemented method of claim 1, further comprising:
    conducting a dialog with the caller, wherein the caller responds to prompts presented as part of the audible advertisement.

9. The computer implemented method of claim 1, further comprising:
    responsive to receiving a request from the caller, connecting directly to an advertised service associated with the audible advertisement.

10. The computer implemented method of claim 1, wherein a matching criterion is a location associated with the caller.

11. The computer implemented method of claim 1, further comprising:
    crediting an account associated with the caller based on an amount of time the caller listens to the audible advertisement.

12. The computer implemented method of claim 1, further comprising:
    billing an advertiser associated with the audible advertisement.

13. A computer program product comprising:
    a computer usable storage medium including computer usable program code for playing audible advertisements on a communication device, the computer program product comprising:
    computer usable program code for selecting an audible advertisement from a set of audible advertisements using criteria matching a user profile associated with a caller in response to receiving a request from a caller to initiate a call;
    computer usable program code for playing the audible advertisement on the communication device to the caller prior to initiating a connection to a callee; and
    computer usable program code for, upon determining that the audible advertisement does not complete before initiating the connection, designating the audible advertisement to remain the selected audible advertisement of the caller.

14. The computer program product of claim 13, wherein playing the audible advertisement on the communication device indicates that the communication device is ready to initiate the call.

15. The computer program product of claim 13, further comprising:
   computer usable program code for customizing the audible advertisement using the user profile.

16. The computer program product of claim 13, further comprising:
   computer usable program code for initiating the call after the audible advertisement terminates.

17. The computer program product of claim 13, further comprising:
   computer usable program code for conducting a dialog with the caller, wherein the caller responds to prompts presented as part of the audible advertisement.

18. The computer program product of claim 13, further comprising:
   computer usable program code for connecting directly to an advertised service associated with the audible advertisement in response to receiving a request from the caller.

19. The computer program product of claim 13, wherein the matching criteria is a location associated with the caller.

20. An apparatus comprising:
   a bus system;
   a communications system connected to the bus system;
   a memory connected to the bus system, wherein the memory includes computer usable program code; and
   a processing unit connected to the bus system, wherein the processing unit executes the computer usable program code to select an audible advertisement from a set of audible advertisements using criteria matching a user profile associated with a caller in response to receiving a request from a caller to initiate a call; play the audible advertisement on the communication device to the caller prior to initiating a connection to a callee; and upon determining that the audible advertisement does not complete before initiating the connection, designate the audible advertisement to remain the selected audible advertisement of the caller.

* * * * *